(No Model.) 2 Sheets—Sheet 1.
D. J. TAPLEY.
PHOTOGRAPHIC CAMERA.
No. 424,146. Patented Mar. 25, 1890.
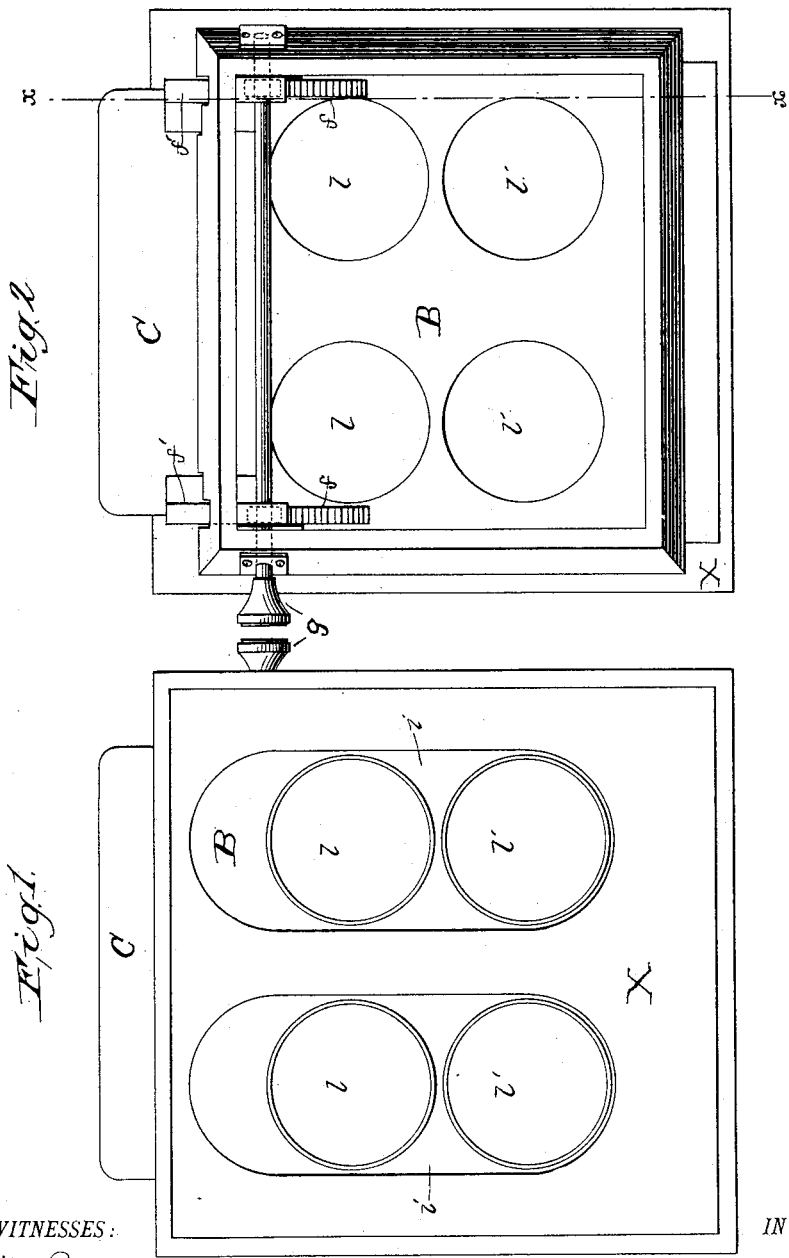
WITNESSES: INVENTOR
Daniel J Tapley.
BY
W. F. Hapgood.
ATTORNEY (No Model.) 2 Sheets—Sheet 2.

D. J. TAPLEY.
PHOTOGRAPHIC CAMERA.

No. 424,146. Patented Mar. 25, 1890.

WITNESSES:
C. W. Benjamin
William Maxl

INVENTOR
Daniel J. Tapley.
BY
W. F. Hapgood.
ATTORNEY

UNITED STATES PATENT OFFICE.

DANIEL J. TAPLEY, OF NEWTOWN, NEW YORK.

PHOTOGRAPHIC CAMERA.

SPECIFICATION forming part of Letters Patent No. 424,146, dated March 25, 1890.

Application filed November 29, 1889. Serial No. 331,950. (No model.)

*To all whom it may concern:*

Be it known that I, DANIEL J. TAPLEY, a citizen of the United States, residing at Newtown, in the county of Queens and State of New York, have invented a new and useful Improvement in Photographic Cameras, of which the following is a specification.

In the standard photographic camera of the class used in taking ferrotypes four lenses are symmetrically arranged in a front plate, so as to take at each exposure four two-and-one-half-by-three-and-one-half-inch (popularly known as "bon-ton") pictures on a five-by-seven-inch ferro-plate.

Whenever, as frequently happens, it is desired to make two "cabinet" (three and one-half by five inches) pictures on the same sized (five by seven) plate at one exposure, it has heretofore been the practice to remove the front board which carries the lens-plates and four lenses and to substitute for it another front board carrying two lenses the axes of which coincide with the centers of the opposite halves of the five-by-seven-inch ferro-plate. This arrangement involved a serious expense for the extra front board, lens-plate, and lenses, and the loss of considerable time whenever the change was made.

The object of my invention is to so construct and arrange the four-lens front board that it can be used with equal facility for making either of the above-described sizes of pictures, changing the camera instantly from the quadruplex to the duplex form, and vice versa, and effecting an important saving in time, as well as in the cost of apparatus.

Figure 4:
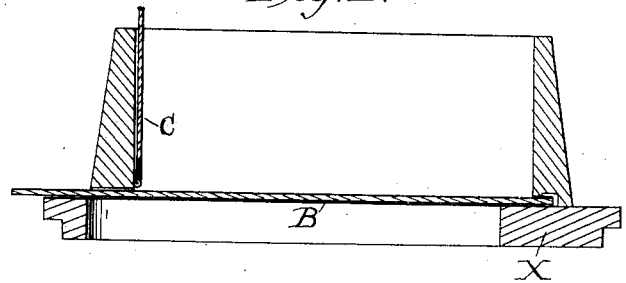
Figure 3:
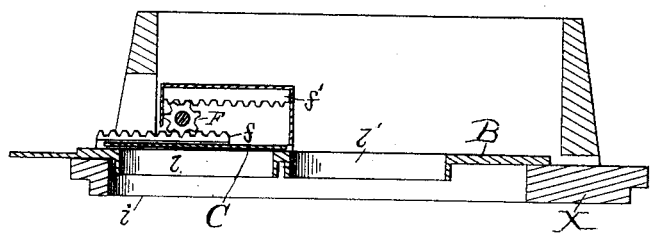

In the drawings, Figure 1 is a rear view of my improved front board. Fig. 2 is a front view of the same. Fig. 3 is a section through $x\ x$, Fig. 1, and Fig. 4 shows another arrangement of the parts.

A front board X, arranged to fit the front end of the camera, carries the lens-plate B, in which are screwed the four inwardly-projecting lenses $l\ l$ and $l'\ l'$. The lens-plate B has a lateral motion relative to the front board, by which it can be slid until the centers of the lenses $l'\ l'$ coincide with the medial line of the front board. The front board is cut away at one side of the aperture through which the lens-tubes pass (or, preferably, oblong slots $i\ i$ are cut) to permit the lateral movement of the lenses, as described. The lens-plate is made wider than in the usual form to cover the apertures in the front board X, which would otherwise admit the light when the lens-plate is moved to one side. A cover-plate C slides in a plane parallel to that of the lens-plate B in front of the face of the lenses. I have shown a pinion F, having a fixed axis and meshing in racks $f$ and $f'$, attached to the parallel plates B and C, the turning of which by means of the milled head $g$ moves the lens-plate B and the cover-plate C in opposite directions.

When four of the bon-tons described are to be made on the five-by-seven-inch ferro-plate, the lenses are left in the central position shown in Fig. 1, the cover-plate C being withdrawn, so as to admit the light to all the lenses. If, however, two horizontal cabinets three and one-half inches high by five inches wide are to be made on the five-by-seven-inch ferro-plate, the pinion F is revolved, sliding the lenses $l'\ l'$ to the central line and simultaneously sliding the cover-plate C over the other pair of lenses $l\ l$, shutting out the light and rendering them inoperative. The position of the lenses and cover-plate when thus arranged as a duplex camera is shown in Fig. 3.

If two vertical cabinets three and one-half inches wide by five inches high are to be made, the front board and its attachments are given a quarter-turn in the front of the camera, and the ferro-plate is placed crosswise in the holder.

The rack and pinion mechanism shown, while being a simple and convenient method of effecting the movement of the two plates B and C in opposite directions, is not an essential feature of my invention, nor is the sliding movement of the cover-plate C a necessary form, as any equivalent mechanism can be substituted for moving the lenses and operating a cover, or the movements can be made directly by hand.

At Fig. 4 it is shown that a hinged flap—C, for example—may be used as an equivalent of the sliding plate for covering the unused pair of lenses $l\ l$.

The drawings show the apparatus as arranged for four lenses; but the same principle may be adapted to other combinations of lenses.

What I claim, and desire to secure by Letters Patent, is—

1. In a photographic camera, the combination of a lens-plate which carries two or more lenses and is adjustable laterally by means of slides in the front board with a cover-plate arranged to cover and shut out the light from one or more of said lenses, substantially as described.

2. In a photographic camera, the combination of the laterally-moving lens-plate B with the slotted front board X and the cover-plate C or its equivalent, substantially as and for the purpose set forth.

3. In a photographic camera, the combination of the slotted front board X, sliding lens-plate B, and cover C, with suitable mechanism for moving said plates B and C, such as the pinion F and racks F F', substantially as described.

DANIEL J. TAPLEY.

Witnesses:
J. E. LUDDEN,
GEO. W. BEST.